United States Patent [19]
Macken

[11] Patent Number: 6,078,420
[45] Date of Patent: Jun. 20, 2000

[54] HOLE-COUPLED LASER SCANNING SYSTEM

[75] Inventor: John A. Macken, Santa Rosa, Calif.

[73] Assignee: Optical Engineering, Inc., Santa Rosa, Calif.

[21] Appl. No.: 09/104,273

[22] Filed: Jun. 24, 1998

[51] Int. Cl.[7] .................................................. G02B 26/08
[52] U.S. Cl. .......................... 359/208; 359/196; 359/365; 359/858; 359/863
[58] Field of Search ...................... 359/196, 201, 359/208, 212, 214, 364, 365, 857, 858, 861, 862, 863; 219/121.74, 121.78, 121.8

[56] References Cited

U.S. PATENT DOCUMENTS

| | | | |
|---|---|---|---|
| 3,827,778 | 8/1974 | Wheeler | 359/858 |
| 4,160,939 | 7/1979 | Damouth et al. . | |
| 4,232,960 | 11/1980 | Glab . | |
| 4,388,651 | 6/1983 | Sherman . | |
| 4,461,947 | 7/1984 | Ward . | |
| 4,469,931 | 9/1984 | Macken . | |
| 4,518,232 | 5/1985 | Dagenais | 359/863 |
| 4,755,999 | 7/1988 | Macken . | |
| 4,921,338 | 5/1990 | Macken et al. . | |
| 4,941,731 | 7/1990 | Macken . | |
| 5,142,119 | 8/1992 | Hillman et al. . | |
| 5,155,323 | 10/1992 | Macken . | |
| 5,206,763 | 4/1993 | Macken et al. . | |
| 5,237,149 | 8/1993 | Macken . | |
| 5,274,492 | 12/1993 | Razzaghi . | |
| 5,276,546 | 1/1994 | Palm et al. . | |
| 5,386,316 | 1/1995 | Cook | 359/365 |
| 5,528,613 | 6/1996 | Macken et al. . | |
| 5,539,180 | 7/1996 | Mori et al. . | |
| 5,561,544 | 10/1996 | Macken . | |
| 5,618,452 | 4/1997 | Matubara et al. . | |

FOREIGN PATENT DOCUMENTS

| | | |
|---|---|---|
| 0 476 965 A2 | 9/1991 | European Pat. Off. . |
| 0 199 650 | 10/1986 | France . |
| 94 07 288 U | 9/1994 | Germany . |

*Primary Examiner*—Cassandra Spyrou
*Assistant Examiner*—Darren E. Schuberg
*Attorney, Agent, or Firm*—Brooks & Kushman P.C.

[57] ABSTRACT

An all-reflective optical system uses a mirror with a hole to transmit a focused laser beam to an on-axis elliptical mirror. The reflected beam from the ellipse is predominately reflected off the mirror with a hole and focused to a distant adjustable focus. This focus spot can be positioned by X-Y scanning mirrors.

7 Claims, 3 Drawing Sheets

6,078,420

HOLE-COUPLED LASER SCANNING SYSTEM

TECHNICAL FIELD

This invention relates to laser equipment utilizing reflective optics which can both scan a laser beam and adjust the optical path to achieve a variable focal length of the laser beam.

BACKGROUND ART

Laser scanning systems typically utilize galvanometer motors to change the angle of scanning mirrors. Usually the X and y direction is scanned by separate motors. In many applications such as marking or cutting, a laser beam is scanned on a workpiece. To achieve a high power density, the laser beam is usually focused on this workpiece. Specialized "flat field" lens have been developed to achieve a good focus on a flat surface workpiece even at a high transmission angle. However, some applications require that the laser beam can be independently focused to accommodate a contoured surface. Normally, this focusing is accomplished by translating one or more lenses in an optical system to achieve a variable focal length. Unfortunately, high powered $CO_2$ lasers can cause a thermal distortion in lenses which increases the focused spot size. Therefore, it is desirable to utilize all reflective optical components for high power $CO_2$ laser applications. U.S. Pat. No. 5,561,544 titled "Laser Scanning System With Reflecting Optics", issued Oct. 1, 1996 by the same inventor as this application, represents a prior approach to solving this problem. That patent is included herein in its entirety by reference.

In my '544 patent, an off-axis elliptical mirror is used to focus the laser beam on the workpiece. An off-axis elliptical mirror actually has two focus points. In this case, one focus point is a long distance from the ellipse and is used to focus on the workpiece. The other focus point is near to the ellipse and is internal to the optical system. To separate the incident and reflected beams associated with this off-axis elliptical mirror, there is typically a 45° angle between rays coming from the internal focus point and leading to the distant focus point. This off-axis geometry introduces less desirable characteristics such as the need for a special focus adjustment technique which does not introduce a translation to the external or distant focus point. However, the most significant drawback is the fact that the 45° off-axis ellipse introduces astigmatism to the laser beam when there is a substantial change in the focal length. Another way of saying this is that the adjustment range of focal lengths to the external focus is smaller than desired. The present invention overcomes this focal adjustment problem and also utilizes fewer mirrors than in my '544 patent.

DISCLOSURE OF INVENTION

The present invention is a laser scanning system utilizing reflecting optics. An input laser beam is reflected off a first concave mirror and brought to a focus at a first focal point (internal focus). This focused laser beam passes through a small hole in a mirror. The laser beam then expands and reflects off a second concave mirror which preferably is an on-axis elliptical mirror. The laser beam then reverses direction back toward the mirror with a hole. When the laser beam reaches the mirror with a hole, the beam is much larger than the small hole. The laser beam then predominantly reflects off the mirror with a hole with only a small percentage of the beam passing through the hole. The laser beam then reflects off one or more movable mirrors which steer the laser beam to the workpiece. The mirror with a hole can be one of the movable mirrors which steers the beam. The distance to the distant focus at the workpiece can also be adjusted by translating the on-axis elliptical mirror.

Accordingly, it an object of the present invention to provide an improved all-reflective high power laser beam scanning system with an improved adjustable focal length which includes at least one scanning mirror to angularly steer a predetermined portion of a laser beam along an optical path to a workpiece. The scanning system has a first reflective surface in the optical path of the laser beam which is curved sufficiently to focus the laser beam at a first focal point. The system also has at least one second reflective surface in the optical path which is spaced from the first focal point and is translatable sufficiently in a predetermined direction to adjust the focus of the laser beam at a second focal point. The system also has a third reflective surface which is optically between the second reflective surface and the second focal point to reflect the focused laser beam to be steered. The optical path has a beam segment of predetermined distance which extends from the third reflective surface to the second focal point so that the translation of the second reflective surface in the predetermined direction changes the length of the optical path from the third reflective surface to the second focal point whereby to change the predetermined distance to adjust the focus of the beam being steered without producing significant angular deviation to the steered beam at the workpiece.

It is also an object of the present invention in the aforesaid improved scanning system to utilize fewer reflective surfaces by locating a hole in the third reflective surface at the first focal point.

A more specific object of the invention is an improved all-reflective high power laser beam scanning system with an adjustable focal length which includes at least one scanning mirror to angularly steer a predetermined portion of a laser beam along an optical path to a workpiece. The scanning system has a first mirror in the optical path of the laser beam which is curved sufficiently to focus the laser beam at a first focal point. The system also has a second mirror in the optical path spaced from the first focal point and curved sufficiently to focus the laser beam at a second focal point and is translatable sufficiently in a predetermined direction to adjust the focus of the laser beam at the second focal point. The system has a third mirror between the first and second mirrors which has a hole at the first focal point for passing the laser beam to the second mirror. The third mirror reflects to the second focal point substantially all of the laser beam which has been passed to the second mirror.

Still more specific objects of the invention are in the last said all-reflective high power laser beam scanning system wherein the first mirror is an off-axis parabolic mirror and/or the second mirror is an on-axis elliptical mirror and/or the third mirror is movable to steer the laser beam to the workpiece.

DETAILED DESCRIPTION OF THE PREFERRED EMBODIMENTS

Figure 1:
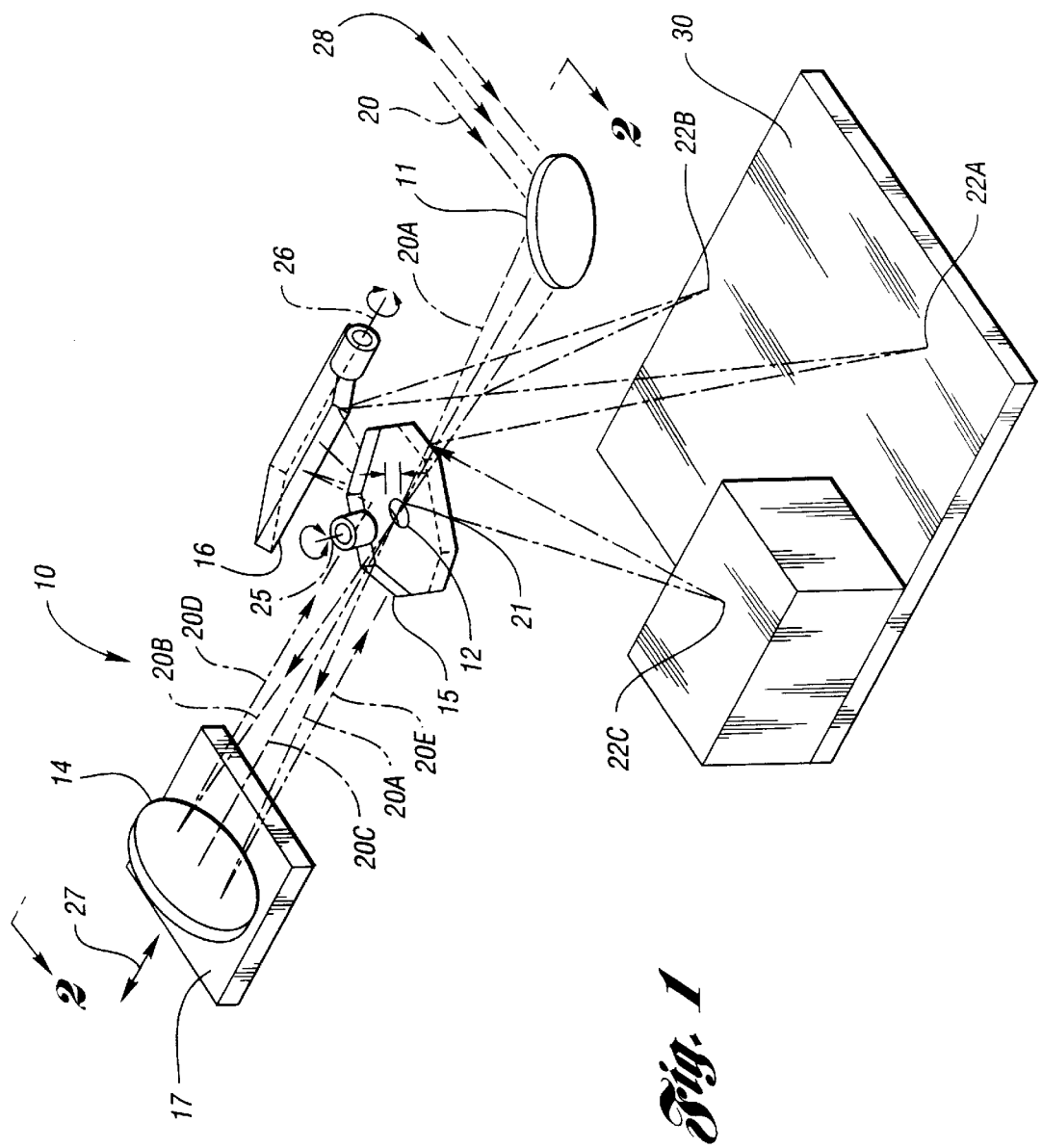
FIG. 1 is a perspective, somewhat schematic view of the laser scanning system of the invention.

FIG. 1 shows a perspective view of an all-reflective laser beam scanning system 10. A laser beam, 20, propagating in the direction of arrow 28 strikes concave reflector 11. In this illustration, reflector 11 is preferably an off-axis parabolic mirror which focuses laser beam 20 at focal point 21. In the preferred embodiment, focal point 21 is centered on hole 12 in mirror 15. The preferred location for focal point 21 is in the plane of the reflecting surface of mirror 15. The laser beam then diverges from focal point 21 after having passed through the small hole 12. The laser beam 21 then propagates along ray path 20C and strikes concave mirror 14. In the preferred embodiment concave mirror 14 is substantially an on-axis elliptical mirror. The term "on-axis ellipse" will be defined later in conjunction with FIG. 3. However, briefly, an on-axis elliptical mirror lies on the major axis of the ellipse. This on-axis elliptical mirror 14 can be translated in a direction 27 which is parallel to the axis of the ellipse. To achieve the translation of mirror 14, this illustration shows mirror 14 mounted to plate 17 which is also translated. The laser beam with incident rays 20A and 20B is then reflected off elliptical mirror 14 and returns respectively with rays 20D and 20E to strike mirror 15.

In the preferred embodiment, mirror 14 is aligned such that central ray 20C propagates back through hole 12 in mirror 15. However, most of the laser beam reflects off mirror 15 on this return path. This will be discussed further later. In the preferred embodiment, the mirror 14 has the closer of the two focal points corresponding to focal point 21. The second (distant) focal point is much further than 21 and corresponds to the working distance to the external focus of the laser scanning system. This second focal point of the ellipse may be over 1 meter away and corresponds to 22A, B, and C in FIG. 1 when the laser beam is deflected by scanning mirrors.

In the preferred embodiment, mirror 15 also serves as one of the two scanning mirrors to deflect the laser beam to the desired focus point. Therefore, this mirror is illustrated as being able to rotate on axis 25. In the preferred embodiment, axis 25 passes through hole 12 to minimize translation of hole 12. The laser beam after reflecting off mirror 15 then strikes mirror 16 which can also be rotated around axis 26. The combination of these two moveable mirrors permits steering of the laser beam to various directions illustrated by reaching focal points 22A, 22B, and 22C.

As can be seen in FIG. 1, it is necessary to adjust the focal length to focus on different parts of the workpiece 30. The focal length change is accomplished by moving mirror 14 along direction 27 as previously stated. Since mirror 14 is an on-axis ellipse, there is no steering of the reflected laser beam when the focal length is changed by moving mirror 14 in a direction parallel to the axis of the ellipse. This translation direction corresponds to direction 27 in FIG. 1.

Figure 2:
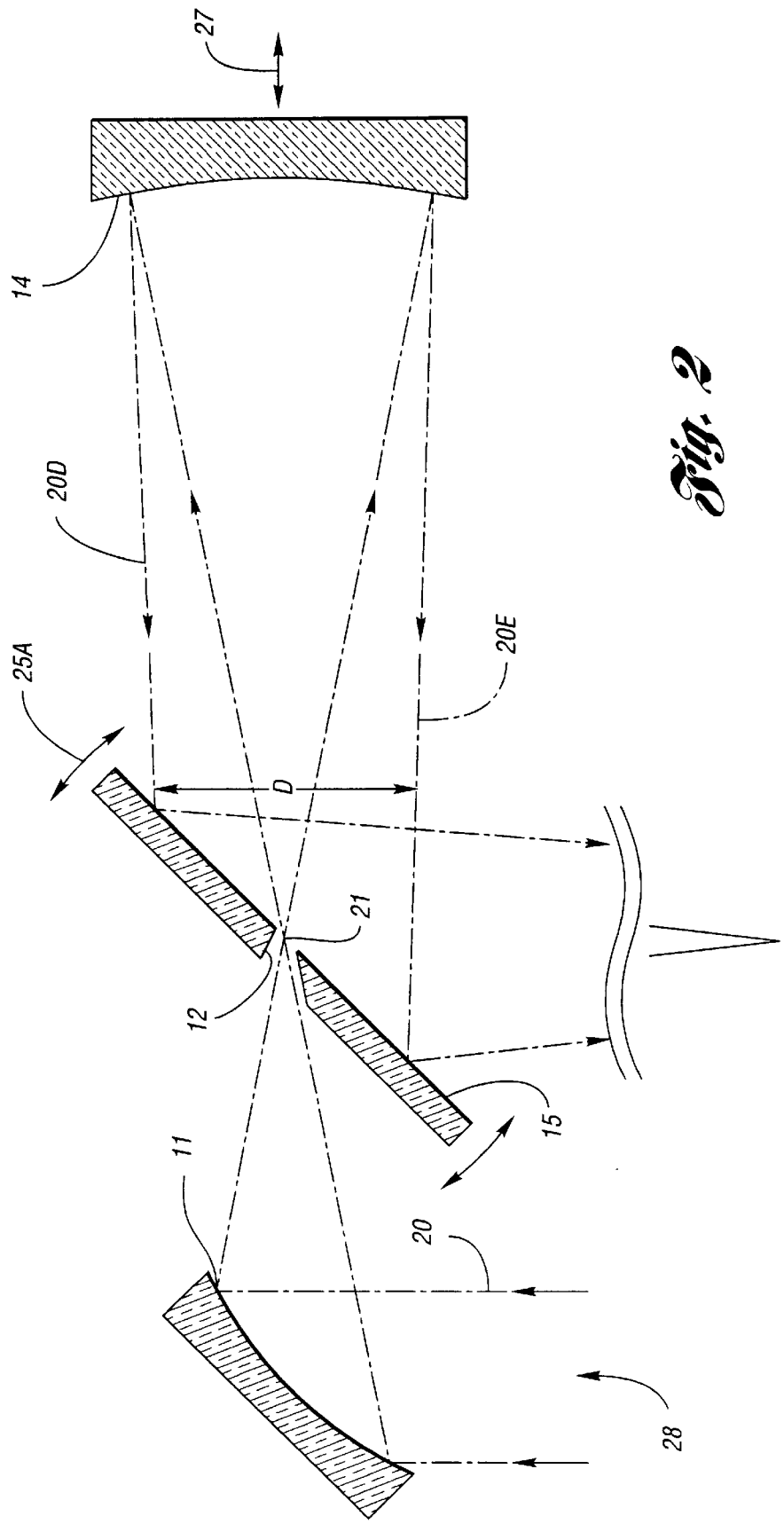
FIG. 2 is an enlarged cross-sectional view of some optical elements of the laser scanning system taken along line 2—2 of FIG. 1.

FIG. 2 is a cross-section of the laser scanning system cut along line 2—2 in FIG. 1. In FIG. 2, input laser beam, 20, is propagating in direction 28 and strikes off-axis parabolic mirror 11 then comes to a focus at 21. Mirror 15 has a hole 12. Focused laser beam 21 passes through hole 12 and propagates to on-axis elliptical mirror 14. Mirror 14 can be translated in direction 27 to achieve a variation in focal length to the external focus 22. Laser beam return path 20D, 20E strikes mirror 15 and reflects to eventually reach an external focus point 22.

Hole 12 has a diameter d, and the laser beam with external rays 20D and 20E has a projected diameter D at mirror 15 when viewed from the direction of mirror 14. In the preferred embodiment, more than about 95% of the laser beam, defined by rays 20D and 20E, strike mirror 15 and less than about 5% of the laser beam passes through hole 12. To achieve this, the following equation should be true:

$$D > 4.5d.$$

In practice, it is possible to achieve even a much smaller transmission loss through hole 12 than this 5%. For example, if hole 12 has a projected diameter d of 3 mm, and if the projected diameter D of the laser beam striking mirror 15 is 50 mm, then the transmission loss of laser light back through hole 12 is less than 0.4%. However, the amount of laser light actually returning to the laser cavity is even much less than 0.4%.

In the preferred embodiment, mirror 15 serves double duty as both the mirror with the hole and as one of the laser scanning mirrors. The ability for mirror 15 to change its angle is illustrated by the curved arrow 25A indicating the direction of motion of mirror 15 about its axis 25. However, it should be understood that it is also possible in other embodiments for mirror 15 to be stationary and for the scanning mirror or mirrors to be located optically between mirror 15 and external focus point 22. For example, in FIG. 1, mirror 15 could be stationary and all of the deflection could be accomplished by mirror 16. In still other embodiments, there could also be an additional scanning mirror besides mirror 16.

Figure 3:
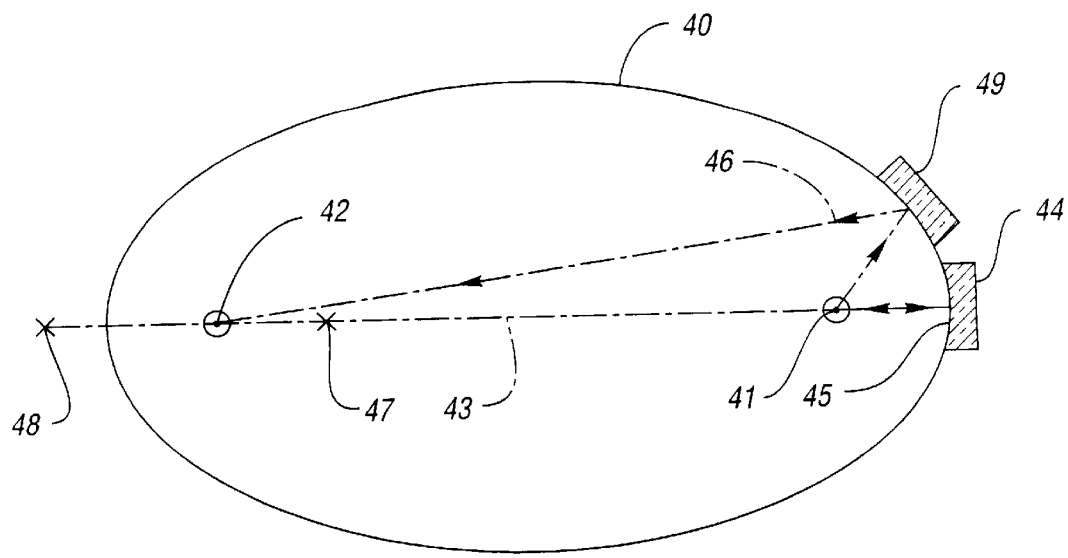
FIG. 3 is an ellipse illustrating mirror characteristics.

The difference between a mirror with an on-axis elliptical surface and a mirror with an off-axis elliptical surface can be illustrated best by FIG. 3. In FIG. 3, there is an ellipse 40, with two focal points, 41 and 42. Also, there is a dashed line 43, which is the "focal axis" of the ellipse 40. This focal axis passes through both focal points 41 and 42. When a mirror is said to have an "elliptical surface" then this reflecting mirror surface is actually just a segment out of an ellipse such as 40 in FIG. 3. For example, segment 44 in FIG. 3 represents a segmental cross-section of a mirror which has an elliptical reflecting surface 45, which is actually a portion or segment of the entire ellipse 40. If the ellipse is said to be an "on axis", then this means that the focal axis 43, passes through the mirror surface. For example, in FIG. 3, focal axis passes through the center of mirror 44.

Figure 4:
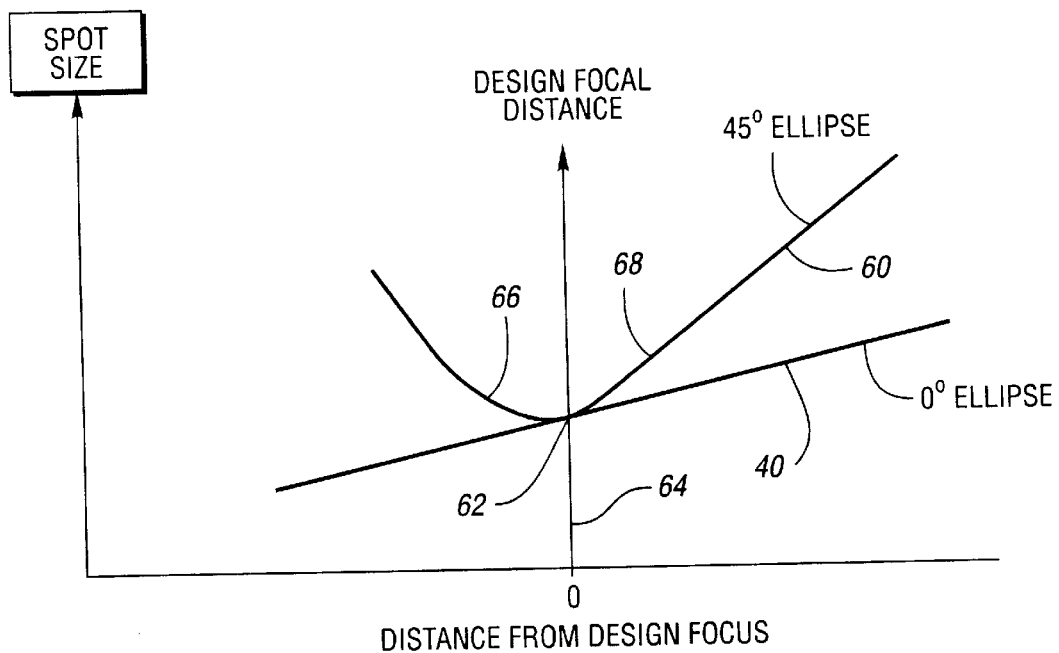
FIG. 4 is a graph illustrating the improved focus spot size achievable with the present invention.

An off-axis ellipse can be illustrated also in FIG. 3. Here, mirror segmental cross-section 49 is shown to be removed from the focal axis of the ellipse. Light passing through focus 41 and reflecting off mirror 49 proceeds to focus 42 as shown by the reflection rays 46. In this illustration, there is approximately a 45° angle A between the incident and reflected arrows 46. My prior laser scanning system utilized a focusing mirror which had an off-axis elliptical surface. The system of this invention utilizes an on-axis elliptical surface. Therefore, mirror 14 in FIG. 2 corresponds to mirror 44 in FIG. 3. The distant focal point 22 in FIG. 2 generally corresponds to focus 42 in FIG. 3. When mirror 44 in FIG. 3 is exactly placed at the surface of ellipse 40, then mirror 44 can be said to be at the design position. Light leaving 41 would come to a perfect focus exactly at 42. However, if mirror 44 in FIG. 3 was placed (translated) closer or further from focus 41 than is shown in FIG. 3, then light emanating from 41 would come to a focus on the focal axis but not at the design focal point 42. One objective to this invention is to increase the adjustment range away from the exact elliptical focal points where laser light comes to a good optical focus. This benefit is illustrated by FIG. 4.

The object of the laser scanning system is to achieve a high power density on the workpiece. This high power density is needed to accomplish a useful task such as cutting or welding. It is desirable to have a large focus adjustment range where the focus spot size is smaller than a predetermined value. When the major focusing element is an off-axis elliptical mirror such as was used in U.S. Pat. No. 5,561,544, the graph of the focused spot size as a function of the distance from the design focus is illustrated by the curve 60 labeled "45° ellipse". This shows that this graph has a minimum spot size 62 which theoretically equals the diffraction limit of the laser beam when the optical focal length equals the ellipse focus discussed in FIG. 3. This ellipse focus distance on the FIG. 4 graph is the line 64 labeled "0" distance from the eclipse focus. However, it can be seen when the optical focus spot is made either a shorter distance 66 or longer distance 68 than the ellipse design focal distance, then the 45° ellipse curve produces a substantially larger spot size than the minimum. In contrast, the curve 70 labeled "0° ellipse", has a focus spot size which is limited primarily by the diffraction limit. This means that focusing the laser beam at a distance shorter than the design focal distance, actually can produce an even smaller focus spot size than is achieved at the design focus. This is the result of the fact that geometric aberrations introduced by the 0° ellipse are insignificant. The focus spot size is then primarily determined by the diffraction limit. Even going to a longer focal length than the design focus can produce a nearly diffraction limited spot size (assuming a good laser beam). It is true that this 0° curve eventually departs from being diffraction limited, but the result remains that it is possible to achieve a smaller spot size over a larger volume with the optical system described here than with my prior optical system. In practice, the useful volume accessible to a laser scanning system can be increased by more than a factor of 4 using this invention compared to my prior invention.

Motion or translation of mirror 14 can be achieved using various translation mechanisms such as a slide driven by a lead screw and an electric motor. Also, deflection of mirrors 15,16 around respective axes 25,26 can be achieved by using galvanometer motors with position feedback.

In the description of this invention, the optical element 11 has been referred to as an off-axis parabola and the optical element 14 has been referred to as an on-axis ellipse. It should be understood that these are the preferred curvatures for these optical elements. However, it would be possible for other concave mirror surfaces to be used with some degradation in the performance. For example, mirror 14 could be a spherical surface. This would enlarge the diameter of the focus spot size at 22. However, for some applications, this enlarged focus spot may still be acceptable. There are other things that could be slightly off-axis or closer to a parabola which would vary from an ellipse by part of a wavelength; i.e. it may be close to an ellipse even if called by some other technical name.

While there has been shown and/or described, preferred embodiments, it is to be understood that other modifications may be made without departing from the spirit and scope of this invention.

What is claimed is:

1. An improved all-reflective high power laser beam scanning system with an adjustable focal length which includes at least one scanning mirror to angularly steer a predetermined portion of a laser beam along an optical path to a workpiece, comprising:
   a first mirror in the optical path of the laser beam and curved sufficiently to focus the laser beam at a first focal point;
   a second mirror in the optical path spaced from said first focal point and curved sufficiently to focus the laser beam at a second focal point and translatable sufficiently in a predetermined direction to adjust the focus of said laser beam at said second focal point; and
   a third mirror between said first and second mirrors and having a hole at said first focal point for passing said laser beam to said second mirror;
   said third mirror reflecting to said second focal point substantially all of said laser beam passed to said second mirror.

2. The improved all-reflective high power laser beam scanning system of claim 1 wherein said first mirror is an off-axis parabolic mirror.

3. The improved all-reflective high power laser beam scanning system of claim 1 wherein said second mirror is substantially an on-axis elliptical mirror.

4. The improved all-reflective high power laser beam scanning system of claim 1 wherein said third mirror is movable to steer the laser beam to the workpiece.

5. An improved all-reflective high power laser beam scanning system with an adjustable focal length which includes at least one scanning mirror to angularly steer a predetermined portion of a laser beam along an optical path to a workpiece, comprising:
   a first mirror in the optical path of the laser beam and curved sufficiently to focus the laser beam at a first focal point;
   a second mirror in the optical path spaced from said first focal point and curved sufficiently to focus the laser beam at a second focal point and translatable sufficiently in a predetermined direction to adjust the focus of said laser beam at said second focal point; and
   a third mirror between said first and second mirrors and having a hole in the plane of the reflective surface of said third mirror at said first focal point for passing said laser beam to said second mirror;
   said third mirror reflecting to said second focal point substantially all of said laser beam passed to said second mirror.

6. The improved all-reflective high power laser beam scanning system of claim 5 wherein said hole has a diameter d, the laser beam has a projected diameter D and a relationship to each other of D>4.5d, said laser beam reflecting from said third mirror to said second focal point more than about 95% of the laser beam received by the reflective surface of said third mirror.

7. The improved all-reflective high power laser beam scanning system of claim 6 wherein said third mirror is movable to steer the laser beam to the workpiece.

\* \* \* \* \*